United States Patent [19]

O'Brien

[11] Patent Number: 4,893,329
[45] Date of Patent: Jan. 9, 1990

[54] CALL DEFERRAL SYSTEM FOR TELEPHONES

[76] Inventor: Terry D. O'Brien, 6310 W. 50th St., Mission, Kans. 66202

[21] Appl. No.: 246,980

[22] Filed: Sep. 20, 1988

[51] Int. Cl.$^4$ .................... H04M 1/64; H04M 1/66
[52] U.S. Cl. ..................... 379/88; 379/199; 379/373
[58] Field of Search .............. 379/199, 373, 88, 67, 379/374

[56] References Cited

U.S. PATENT DOCUMENTS

| | | | |
|---|---|---|---|
| 4,266,098 | 5/1981 | Novais | 379/77 |
| 4,547,630 | 10/1985 | Giammarrusco | 379/88 |
| 4,556,761 | 12/1985 | Hashimoto | 379/73 |
| 4,578,540 | 3/1986 | Borg et al. | 379/40 |
| 4,585,907 | 4/1986 | Giammarrusco | 379/88 |
| 4,600,809 | 7/1986 | Tasumi et al. | 379/88 |
| 4,616,110 | 10/1986 | Hashimoto | 379/88 |

FOREIGN PATENT DOCUMENTS

| | | | |
|---|---|---|---|
| 3347331 | 7/1985 | Fed. Rep. of Germany | 379/199 |
| 0089161 | 7/1981 | Japan | 379/199 |
| 0240261 | 11/1985 | Japan | 379/88 |

Primary Examiner—Thomas W. Brown
Attorney, Agent, or Firm—Kokjer, Kircher, Bradley, Wharton, Bowman & Johnson

[57] ABSTRACT

A telephone call deferral system which allows incoming telephone calls to be deferred for a user selected period or until a user selected time. During the defer time, incoming calls are intercepted, the ring sound is suppressed, and the caller receives a voice message indicating that calls are not currently being received but will be at the specified defer time. Programming of the defer mode of operation is effected from the key pad of any telephone instrument connected with the telephone line of the user. An override system allows emergency calls to be completed from parties in possession of a special access code.

21 Claims, 5 Drawing Sheets

CALL DEFERRAL SYSTEM FOR TELEPHONES

BACKGROUND AND SUMMARY OF THE INVENTION

This invention relates generally to the field of telecommunications and deals more particularly with a method and apparatus by which telephone subscribers can defer incoming calls either until a user selected defer time or for a user selected defer period.

Telephone subscribers often have a desire to avoid being disturbed by incoming telephone calls for a particular time or until a particular time. For example, if a nap is to be taken, ringing telephones can create problems by interrupting the nap. Similarly, a one or two hour television program or other activity is more enjoyable if not disturbed by incoming telephone calls.

Although it is possible to turn off the ringer of many telephones and thus prevent them from ringing, this approach has several drawbacks. First, calling parties are led to believe there is no one present at the premises that are called because the ringback tone is still generated to the calling party and the call is not answered. Additionally, the person who turned off the ringer may forget to turn it back on and it can remain off indefinitely even though this is not intended. Another problem is that emergency calls as well as routine calls do not ring through, and the emergency caller has no way to complete the call.

The present invention is directed to a call deferral method and apparatus that can be implemented either at the premises of a telephone subscriber or at the central switching office of the telephone company. In accordance with the onpremises implementation of the invention, a call deferral device receives power from a standard electrical outlet, and it may be plugged into a telephone jack. The device includes an interface circuit that acts to the telephone central office the same as a telephone set. In normal operation when the device is not in the defer mode, incoming calls are treated in the usual manner the same as if the device were not present on the line.

It is an important feature of the invention that the deferral device is not dedicated to any particular telephone set but instead can be addressed and programmed from any telephone on the subscriber line. The device receives DTMF signals entered from the key pad of any of the telephones on the line. If the DTMF entries represent outgoing calls, (i.e., the only key pad entries are on the 0-9 digit keys on the key pad), they are ignored by the device and the outgoing calls can be completed in the normal fashion. However, if one of the special function keys (the * or # key) is entered, the device detects command entries and verifies that the commands represent valid instructions to enter the defer mode.

It is another special feature of the invention that the user can make defer commands that are commands either for a specified defer time (i.e., defer calls until the defer time such as until 3:00 p.m.) or for a specified defer period (i.e., defer calls for the duration that is entered such as for a period of one hour). The device keeps track of the time of day and, in the case of a valid defer period entry, computes the defer time by adding the specified defer period to the current time of day. In both command entry modes, commands are entered in a simple manner by depressing appropriate digit keys, specifying the defer period or defer time followed by the * or # key to specify whether the defer period mode or defer time mode is selected.

When the device is operating in the defer mode, incoming calls are deferred until the defer time, and normal operation (i.e., no deferral of calls) automatically resumes at the defer time. In the defer mode operation, the device detects a valid ring signal, suppresses the telephone ringers, seizes the telephone line and transmits to the calling party a synthesized voice message indicating the telephone number of the called party, the fact that calls are not now being accepted, and the defer time after which the call can be repeated without intervention.

Thus, the user can select either the time at which he desires for call deferral to end or the period during which it is to be in effect. In either case, programming can be carried out from any telephone on the line with a minimum of key entries required. Calling parties are informed of the fact that calls are being deferred at the request of the called party and are also informed of the time at which the deferral period ends.

Callers having a special access code can override the deferral of calls in emergency situations by entering the access code on their telephone key pads after receiving the deferral message. The access code entry interrupts the defer mode for a one minute period so that the call can be repeated and passed through normally. Consequently, if an authorized possessor of the access code must complete the call because of an emergency, he can do so by overriding the deferral.

The call deferral can be implemented in much the same manner in the telephone central office. The central office implementation has the advantage of making use of hardware that is already present in the central office. Also, incoming calls made during the defer time are not completed but are instead intercepted at the central office of the called party. Consequently, the billing sequence is not completed and there is no toll charge for long distance calls attempted during the deferral period.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figures 1, 2:
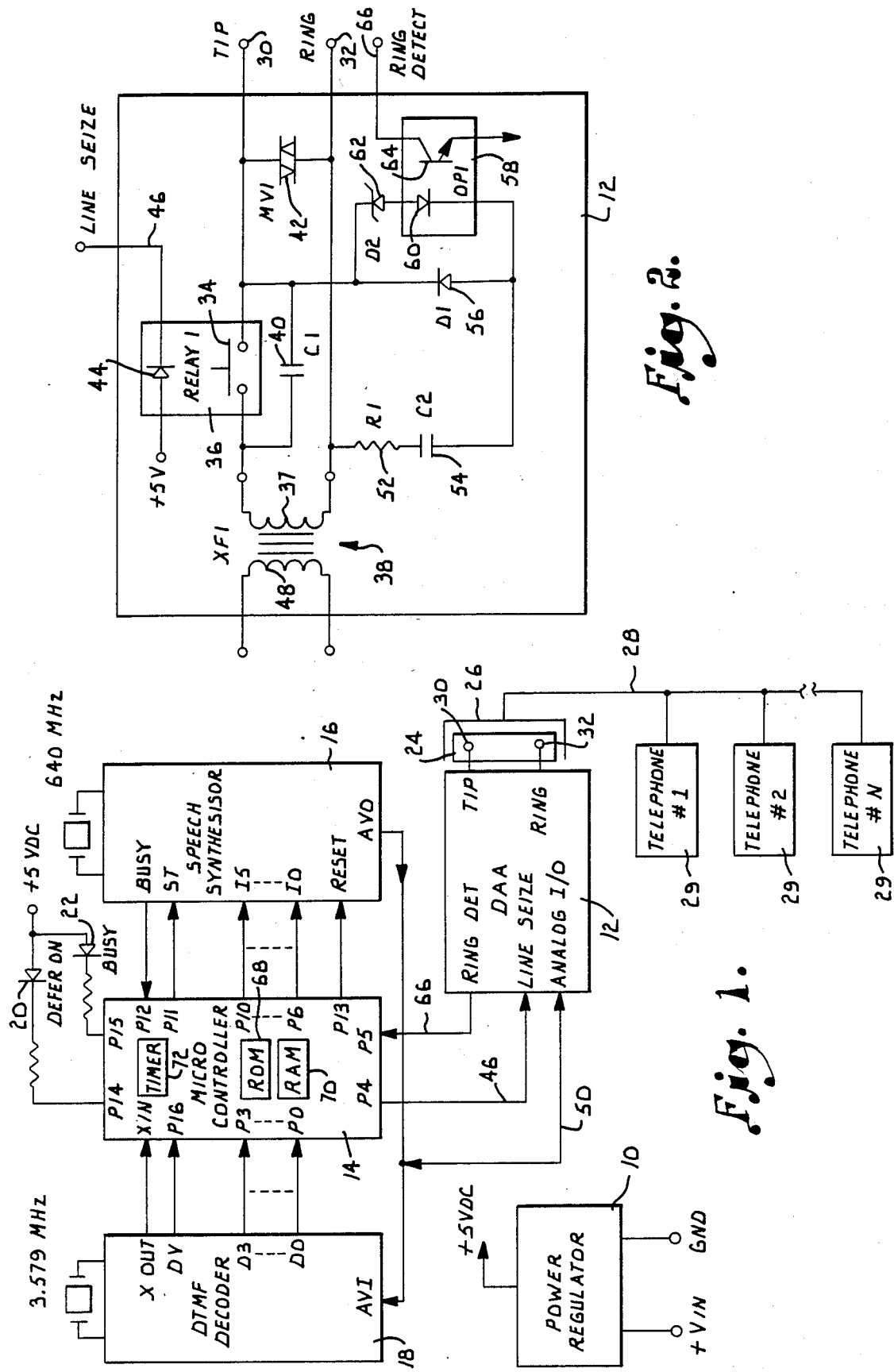
FIG. 1 is a functional block diagram of a call deferral device constructed according to a preferred embodiment of the present invention.
FIG. 2 is a block diagram of the interface circuit of the call deferral device.

Referring now to the drawings in more detail and initially to FIG. 1 in particular, the present invention provides a device that can be set in a defer mode and will then act to intercept incoming telephone calls, suppress the normal ringing sound and inform the calling party, using speech synthesis, of a user programmed time at which the call can be repeated without intervention. The device includes a power supply 10 which supplies regulated 5 volt DC power for operating the system components. Four major functional blocks are included in the device, namely a direct access arrangement (DAA) block 12, a microcontroller 14, a voice synthesizer 16 and a dual tone multi-frequency (DTMF) decoder block 18.

The call deferral device preferably takes the form of a small rectangular module which houses the components that make up the functional blocks of the system and which includes a pair of indicator LED's 20 and 22 for indicating the status of the device. LED 20 is energized when the device is operating in the defer mode and LED 22 is energized when an incoming telephone call is being processed. A telephone cable extending from the module carries a telephone plug 24 which mates with a standard telephone jack 26 to provide an interface between the device and the subscriber telephone line 28. The power supply 10 may be carried on another cable and may be plugged into a standard electrical outlet to operate from available 120 volt AC power. Any number of conventional telephone sets 29 may be connected with the telephone line 28 in the usual fashion.

Block 12 provides the interface with the telephone line 28 and must meet the requirements specified by regulatory authorities. When the subscriber line is in the on hook state, the telephone line 28 receives approximately 50 volts DC across its tip and ring conductors which connect with the respective tip and ring terminals 30 and 32 of the plug 24. In the on hook state, the DC impedance path across the tip and ring lines presents a high impedance on the order of 5 megohms or more. Consequently, only a small amount of leakage current in the microamp range is drawn. When one of the telephone sets 29 connected with the telephone line 28 is taken off hook, a DC impedance path of 200 ohms or less is established between the tip and ring lines. Then, the current drawn is increased to the tens of milliamp range, and this increased current draw provides a signal to the telephone switching station ("central office") indicating that the line has gone off hook. A dial tone is then generated on the telephone line. The off hook current also provides operating power for the telephone sets on the line.

When the telephone line 28 is in the on hook state and an incoming call is addressed to the number corresponding to the line, the normal DC voltage of 50 volts is modulated with an AC voltage of 80–120 volts at 20–80 Hz. This modulating voltage is AC coupled to the ringer in the telephone set and creates a ringing sound indicating an incoming call. There is still no DC path between the tip and ring lines. If the receiver of the telephone set is lifted, the telephone line goes to the off hook state and the telephone central office then terminates the ring signal and completes the connection to the calling party.

The device of the present invention acts electrically the same as a telephone set in the on hook state; i.e., it offers a negligible current path between the tip and ring lines. Referring particularly to FIG. 2, the DAA block 12 includes the normally open contact 34 of a photo relay 36 and one side 37 of a transformer 38 arranged in series between the tip and ring terminals 30 and 32. A capacitor 40 is arranged in parallel with the relay contact 34. A metal oxide varistor 42 is connected directly across the tip and ring terminals to suppress potentially destructive high voltage transients that might exist on the telephone line. Thus, in the normally open state of contact 34, a DC path between the tip and ring terminals is lacking.

A photo diode 44 forming part of relay 36 is forward biased by +5 volts DC and is connected on its opposite side with a line seize conductor 46 that leads to the P4 port of microcontroller 14 (see FIG. 1). Transformer 38 has a second side 48 that connects with an analog in/out line 50 (FIG. 1). Line 50 applies from the DAA block 12 analog voltage in signals to the AVI port of the DTMF decoder block 18. Line 50 also receives and applies to block 12 analog voltage out signals from the AVO port of the speech synthesizer block 16.

A resistor 52 and capacitor 54 are connected between terminals 30 and 32 in series with one another and with a diode 56. An opto-isolator 58 includes a photo diode 60 which is arranged in series with a Zener diode 62 having a threshold of 55 volts. Diodes 60 and 62 are arranged opposite to one another in polarity, and are arranged in parallel with diode 56 which is in turn oriented opposite in polarity to the photo diode 60. The opto-isolator 58 includes a photo-sensitive transistor 64 having its emitter side connected with system common and its collector side connected with a ring detect line 66 that leads to the P5 port of microcontroller 14 (see FIG. 1).

By this arrangement, AC ring signals applied to the tip and ring lines are AC coupled through resistor 52 and capacitor 54 to the opto-isolator 58, and the photo diode 60 conducts current during those half cycles it is forward biased. Diode 56 conducts during the half cycles the photo diode 60 is reverse biased and thus serves a protective function. Capacitor 54 limits the current per the rate of change of the ring signal voltage and also blocks DC. Resistor 52 limits the current in the event of fast transients.

During the half cycles that diode 60 is forward biased, a threshold voltage of 55 volts across the Zener diode 62 is required before current can flow through the photo diode 60. Since this 55 volt threshold is above the level of the normal 50 volt DC line voltage across the tip and ring lines, the normal line voltage is prevented from coupling through the opto-isolator 58. Even though DC is blocked by capacitor 54 under static conditions, a toggling between the on hook and off hook state can create a time rate of change in the line DC voltage large enough to cause capacitor 54 to conduct sufficient current that the opto-isolator diode 60 would conduct. However, this situation is averted by the presence of the Zener diode 62 and its 55 volt threshold.

In the event of a valid ring signal large enough to trigger the opto-isolator 58 through Zener diode 62, the photo diode 60 is conductive for those half cycles during which it is forward biased. When diode 60 conducts, photo transistor 64 is likewise conductive and pulls the P5 port of micro-controller 14 low. Port P5 is thus alternately driven high and low during each cycle of an incoming ring signal present on the telephone line.

Incoming signals received at port P5 are subjected to software qualification as to period and duty cycle to verify the validity of a ring signal. If a valid ring signal is verified, the microcontroller 14 changes the state of its P4 port from high to low. Then, diode 44 conducts and the relay contact 34 closes to DC couple the tip and ring lines across coil 37 of transformer 38. Since this establishes a DC path of less than 200 ohms between the tip and ring lines, the telephone central office interprets that an off hook state exists, and the ring signal is terminated and the connection to the calling party is completed.

Capacitor 40 and transformer 38 create the AC impedance required to met applicable regulatory specifications. Capacitor 40 also serves the important purpose of coupling DTMF signals through transformer 38 to the DTMF decoder 18 along line 50. As a result, the device of the present invention can be programmed from any of the telephone sets 29 that share the subscriber line 28, as will be described in more detail.

The microcontroller 14 includes a factory programmed read only memory (ROM) 68 which contains the executable code that determines the functional characteristics of the microcontroller. The microcontroller is preferably a single chip, four bit LSI microcomputer with an on-chip RAM 70 and an on-chip timer 72, as well as the ROM 68. The input/output ports of the microcontroller are defined as either inputs or outputs by the software initialization routine. There are seven inputs, including a single DTMF data available port (P16), four DTMF binary data ports (P0-P3), a speech synthesizer busy port (P12) and the ring detect port P5. The nine output ports include the line seize port (P4), a start speech synthesizer port (P11), five synthesizer word select ports (P6-P10) and the two ports (P14, P15) which control the status of the LED's 20 and 22. The only other connections for the controller are on port Xin which connects with an externally applied clock sourced from the DTMF decoder 18 and a power up reset port (P13) which resets the voice synthesizer 16.

The microcontroller 14 controls the logic state of its output ports in accordance with program execution and the status of its input ports. The internal timer 72 is connected to the clock source on the Xin port and acts to count the clock cycles and generate an interrupt each time a terminal count state is reached. The interrupt signals (preferably 10 per second) force program control to be momentarily turned over to the time keeping routine so that normal program execution and time keeping can easily coexist.

The speech synthesizer 16 receives encoded binary data on its five input ports 10-15 such that the input data selects one of 32 available blocks of data in the speech data memory of the synthesizer. Each block of data in the memory corresponds to a word or phrase, and there is a menu available of up to 32 different words and/or phrases which can be selected. The blocks of voice data are stored in binary form and when selected are transformed by a D/A converter into an analog voltage waveform that is suitably processed and transmitted to line 50 via the AVO port of the speech synthesizer 16. The waveform is coupled through transformer 38 onto the telephone line 28 as a voice message the content of which depends upon which block of data has been selected by the microcomputer.

The DTMF decoder 18 receives, validates and processes touch tone signals which are present on the telephone line 28. Valid signals are latched onto the output register of the decoder 18 and transmitted to the microcontroller 14 from the data outputs D0-D3 of the decoder block. As previously suggested, it is an important feature of the invention that the device is accessible from any of the telephone sets 29 connected with the line 28 to which the device is applied. Programming of the device and the entry of other data is effected by the push button key pads of the telephones. The characteristic tones of the different digits (0-9) keys and the special function * and # keys are applied from any of the telephone sets 29 to line 28 and to the tip and ring terminals 30 and 32. The touch tone signals are AC coupled through capacitor C1 to the transformer 38 and then to the AVI input of decoder 18 on line 50. Thus, the key pad of any of the telephone sets 29 can be used to apply DTMF signals for entering data in the DTMF decoder 18.

Figure 3:
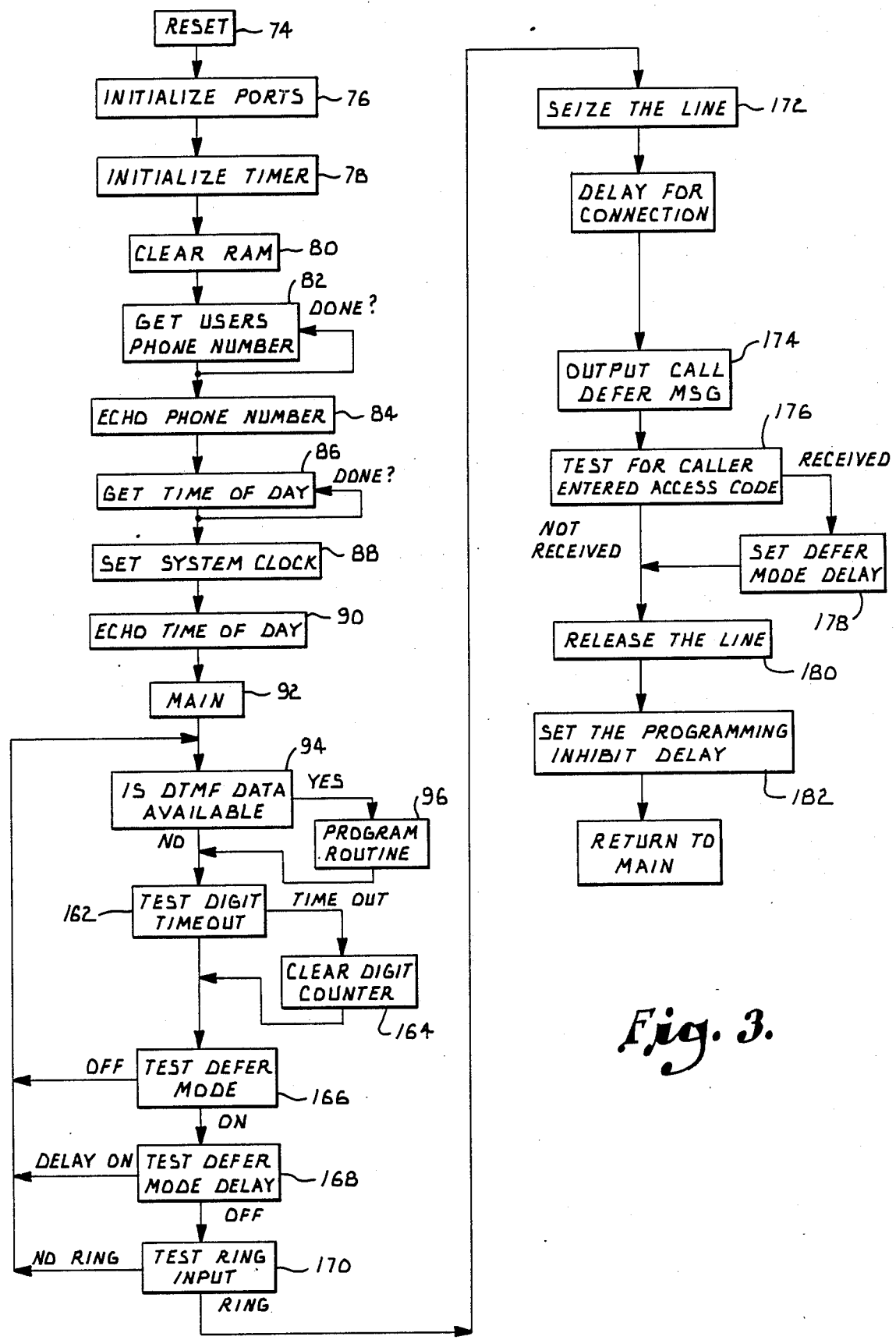
FIG. 3 is a flow chart for the software of the initialization segment and the main control loop used in the call deferral device.

FIGS. 3-7 depict flow charts of the software architecture. Referring first to FIG. 3, an initialization segment of the software sets the hardware at the desired operating state at power up. From the reset block 74, the in/out ports are all initialized in block 76, the timer 72 is initialized in block 78 and the RAM 70 is cleared in block 80. This assures that the system is in the normal state (defer mode off) when power is initially applied.

The initialization segment of the software also involves acquiring from the user the data necessary for normal operation, including the telephone number of the user, the time of day and, optionally, an access code (if no access code is entered at setup, the system automatically defaults to 99). Since this information need be entered only if there is a power loss to the system, the only path to the setup routines is through power up (reset) of the system.

After the ports and times have been initialized and the RAM has been cleared, the system requires entry of the user's telephone number and the current time of day. The telephone number is entered at block 82 simply by depressing in sequence the key pad digit keys corresponding to the user's telephone number on any of the telephones 29. After the seven digit number has been entered, the voice synthesizer will cause it to be echoed back through the handset, as indicated at block 84. The user should then depress the * key if the number is correct or the # key if it is incorrect. If the # key is depressed, the number must be entered again. For example, if the number 262-5177 is entered, the voice response verification applied to the handset will be "two, six, two, five, one, seven, seven". If the number is correct, the * key is depressed to enter it.

Next, the time of day is entered in block 86. The time consists of three or four digits followed by the * key for AM or the # key for PM. Thus, if 1226 # is entered on the key pad, the time entry is 12:26 PM. The system clock is set to the time entry in block 88 and the voice synthesizer echoes the time to the handset in block 90, in this case "twelve, two, six, PM".

Figure 4:
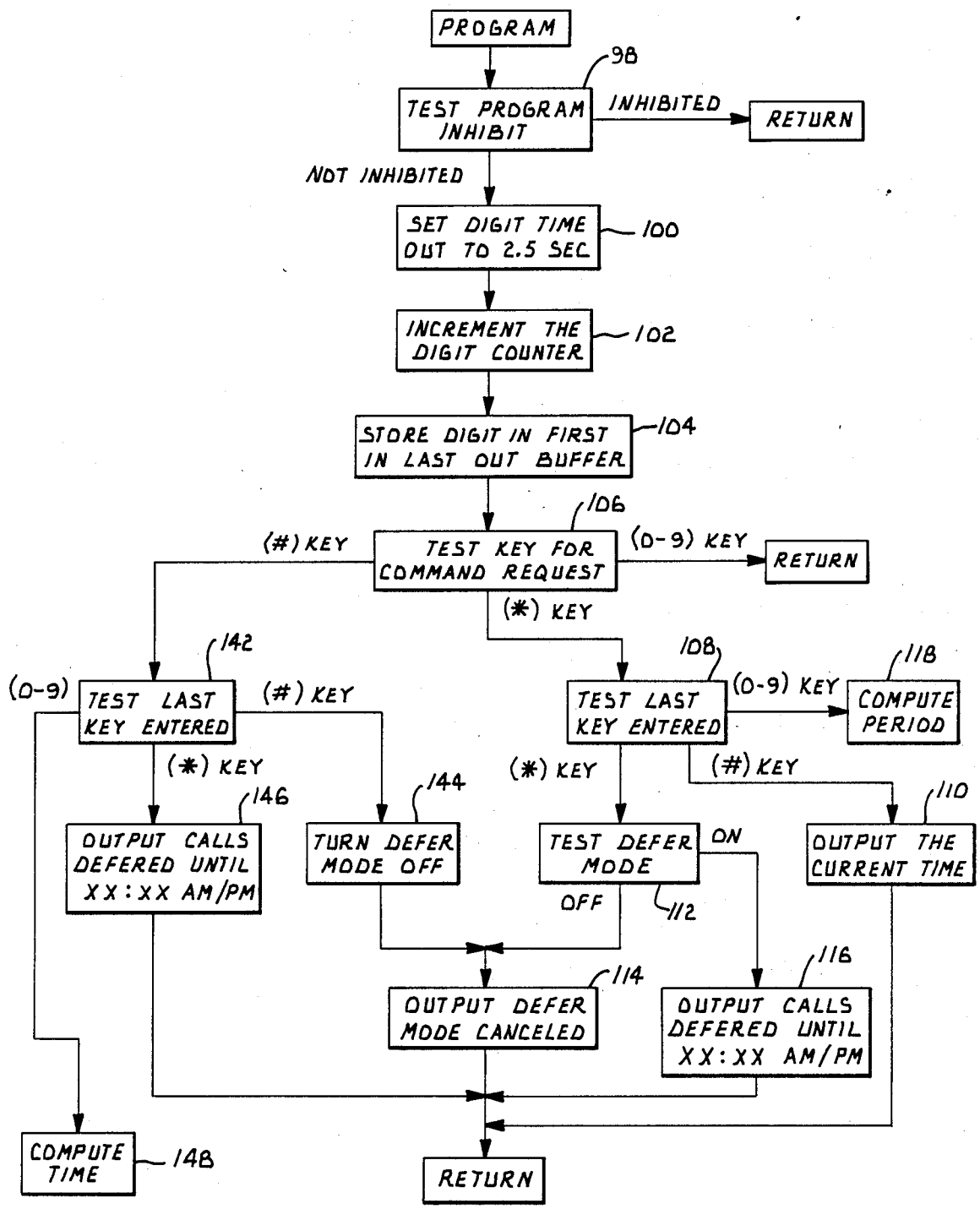
FIG. 4 is a flow chart for the program segment of the software.

This completes the initialization segment of the software, and the main control loop is automatically entered at block 92 immediately upon completion of the entry of setup data. In the main control loop, repeated polling occurs in block 94 to determine when program commands are given. If the polling detects entry of DTMF data, block 96 and the program routine shown in FIG. 4 are entered.

There are two different control strategies available in the defer mode. One control strategy is a defer period technique by which a user selected deferral time period is entered. For example, if the user wants to take a one hour nap and not be disturbed by ringing telephones, he can program a one hour defer period during which the system will operate in the defer mode. At the end of the one hour defer period, the system automatically reverts to the normal operating mode in which incoming calls are received in the normal manner.

The defer period control strategy can be selected by entering on the key pad a one or two digit number followed by the *. If only one digit is entered, it is treated as a tens of minutes entry. Thus, an entry of 5* is a command for a 50 minute defer period. With a single digit entry, the maximum defer period is 90 minutes. If a two digit entry is made, the first digit is treated as an hour entry and the second digit is treated as a tens of minutes entry. Thus, an entry of 23* is a command for a deferral period of two hours and thirty minutes. The maximum defer period is 9 hours and 90 minutes or 10½ hours.

It is a particular feature of the invention that the microcontroller, under software control, computes the time the period is to expire based on the defer period entry and the time of day of its entry. For example, if a 50 minute defer period is entered at 3:00 AM, the end of the defer period (or termination of the defer mode) is automatically calculated to be 3:50 AM, and this time is announced to callers during the defer period. Similarly, if a 2 hour and thirty minute defer period is entered at 4 PM, the end of the defer period is calculated to be 6:30 PM and is announced to callers as the defer time after which the call can be repeated without intervention. This computational capability allows programming of selected defer periods even if the user is unaware of the current time. In order to reduce the amount of speech storage memory that is required, the defer time is rounded off to tens of minutes so that there is no need for the numbers 13-19. Greater precision can be achieved such as rounding to five minute increments, requiring only addition of the number 15 to the available vocabulary.

The other available control strategy is a defer time technique by which the user selects a time of day as the defer time. This option can be selected by entering either two or three digits followed by a # entry. The last digit entered is interpreted as tens of minutes and the other one or two digits represent hours. Thus, an entry of 9 3 # is a command for a defer time of (9:30 and an entry of 1 2 4 # is a command for a defer time of 12:40. It is noted that the defer time is not dependent upon the current actual time.

In order to free the user from having to make an AM/PM choice, it is assumed that the maximum deferral period is 11:59. Thus, the AM/PM status of the defer time can be computed based on the current time using a software algorithm that follows the following rules:

If current hours = 12, use the current AM/PM state for the defer time state;

If defer hours = 12, use the converse of the current AM/PM state for the defer time state;

If defer hours are greater than the current hours, use the current AM/PM state for the defer time state;

If defer hours are less than the current hours, use the converse of the current AM/PM state for the defer time state.

The program routine depicted in FIG. 4 includes a test program inhibit block 98 in which it is determined whether or not the program inhibit delay is active. The program inhibit delay is a period of 15 seconds that is set each time a calling party has been given a defer message and the system goes back on hook. The purpose for this delay is to prevent a calling party from entering DTMF commands from the calling station between the time the device goes back to the on hook status and the time the telephone line connection to the calling party is actually terminated. If the program inhibit delay is unexpired, as determined at block 98, the program routine is exited and return is made to the main control loop.

However, if the 15 second program inhibit delay has expired, block 100 is entered. In order to permit the device to verify command entries, a first in-last out (FILO) buffer and a digit counter are provided. The FILO buffer holds four digits and retains the last four digits that have been entered via one of the telephone key pads. The digit counter is incremented each time a digit is entered in the FILO buffer, and it is reset to zero if a valid command sequence is entered of if more than 2.5 seconds have elapsed between successive digit entries. The count state of the digit counter is used to determine how many of the digits in the FILO buffer are part of a command entry. The 2.5 second time out period assures that old data that remains in the FILO buffer will not be erroneously interpreted as part of a command string.

In block 100, the digit time out period is set to 2.5 seconds, and the digit counter is incremented in block 102. Block 104 effects storage of the digit in the FILO buffer. Then, the key is tested for the command request in block 106. If the key is a digit (0-9), one of the command requests (* or #) has not been made and the main loop is resumed.

However, if the * key has been entered, the program routine continues and the last key entered is tested in block 108. An entry of # * represents a data query as to the current time of day, and block 110 is thus entered if block 108 determines that the last key entered was the # key. A voice message stating the current time is then generated and the main control loop is resumed.

Entry of ** represents a request for the status of the defer mode. Thus, block 112 is entered and the defer mode is tested if block 108 determines that the last key entered was the * key. If the defer mode is off, block 114 is entered and a voice message is generated stating "defer mode cancelled". If the defer mode is on, block 116 is entered and a voice message is generated stating that "calls are deferred until [the programmed defer time]".

Figures 5, 6:
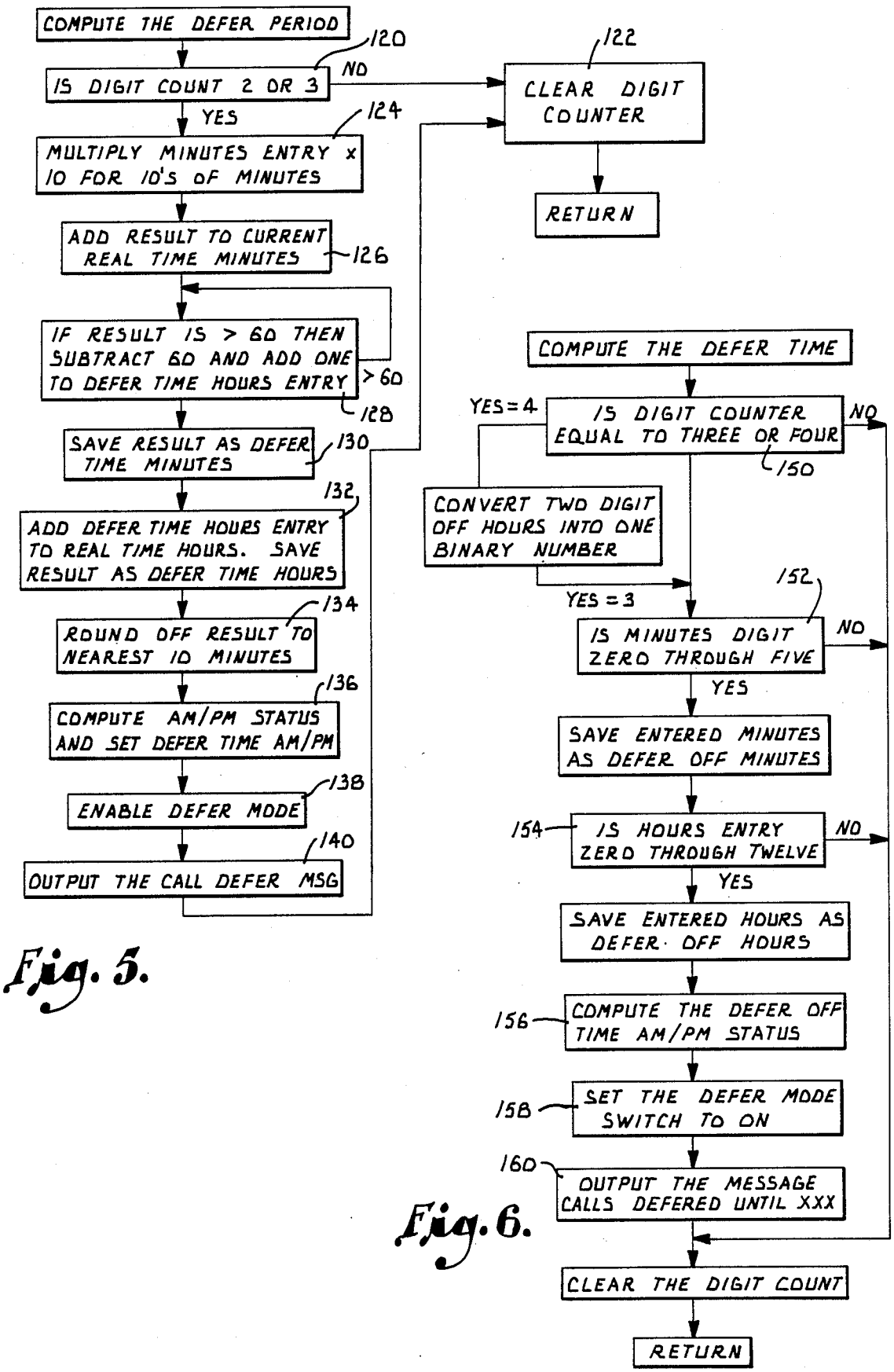
FIG. 5 is a flow chart for the segment of the software that computes defer times when defer periods are programmed.
FIG. 6 is a flow chart for the segment of the software that computes defer times validly programmed.

If block 108 determines that the last key entered was one of the digit keys (0-9), block 118 is entered and the defer period is computed according to the routine depicted in flow chart form in FIG. 5. Block 120 is first entered to ascertain that 2 or 3 digits were entered prior to entry of the * key. If they were not, the command is invalid and the digit counter is cleared in block 122 prior to resuming the main loop.

If 2 or 3 digits were entered before the * key entry, the computations indicated in blocks 124, 126 and 128 are made to determine the minutes part of the defer time which is held in block 130. The hours part of the defer time is computed in block 132, and the rounding off operation is carried out in block 134 prior to the computation of AM or PM status of the defer time in block 136. Block 138 enables the defer mode and the call defer message is effected in block 140 as a voice message that "calls deferred until [the computed defer time]". Finally, block 122 clears the digit counter and the main control loop is resumed.

Referring again to FIG. 4, if block 106 determines that the # key has been entered, block 142 tests the prior entry. A ## entry is used to cancel the defer mode, and block 144 is then entered prior to block 114. A * # entry is a data request for the defer message and block 146 is entered to generate a voice message exactly as would be output to a caller. The main loop is then resumed.

If it is determined in block 142 that one of the digit keys was entered prior to the # key, block 148 is entered and the routine depicted in flow chart form in FIG. 6 is carried out. Block 150 assures that the number of digit entries corresponds to a valid command, and blocks 152 and 154 verify that permissible minutes and hours entries have been made. The AM/PM status of the defer time is computed in block 156. The defer mode is enabled in block 158 and the call defer message is output in block 160 before the digit counter is cleared and the main loop is resumed.

Referring again to FIG. 3, if it is determined in block 94 that there has been no DTMF data entered, block 162 tests for the digit time out period of 2.5 seconds and block 164 clears the digit counter if the time out period has elapsed. If the defer mode is off, as determined at block 166, the main loop is resumed. If the defer mode is on, block 168 is entered to determine whether the system is in a defer mode delay status. This status is effected by a calling party who has attempted a call and received a defer message. If the caller enters a valid access code (programmed by the user or defaulted to 99) at the end of the defer message, the defer mode is overridden for a period of one minute and the calling party can place the call again and complete it normally without intervention. Thus, if block 168 determines that the defer mode delay is on, the main loop is resumed.

If the defer mode delay is inactive, block 170 polls for the presence of a valid ring signal indicating an incoming call. If a ring signal is detected, the telephone line is seized (block 172), the connection is made after a suitable delay, and the call defer message is generated at block 174. The voice message given to the calling party may be "You have reached 262-5177. We're sorry, we're unable to take your call at this time. Please return your call after [the defer time]".

After the call defer message is given, block 176 tests for the entry of a valid access code by the calling party. If it is received, the defer mode delay period of one minute is set at block 178. The line is released at block 180, and the 15 second program inhibit delay is set at block 182 before returning to the main loop.

In this manner, the device of the present invention allows telephone calls to be deferred for user programmed times and automatically informs callers when their calls can be repeated without intervention. The defer time can be selected either as a time of day at which the defer mode is to terminate or as a defer period, in which case the defer time is computed automatically. In either case, the device is not dedicated to any particular telephone instrument but is instead globally available to all telephone sets that share the telephone line to which the device is connected. In addition, all command entries are made in a simple manner from the keys of any telephone key pad on the line and there is no need for separate switches to set defer times. The program inhibit delay feature enhances the security of the device and prevents calling parties from tampering with the command entries. At the same time, the defer mode delay permits emergency calls to be completed from those in possession of the access code.

Figure 7:
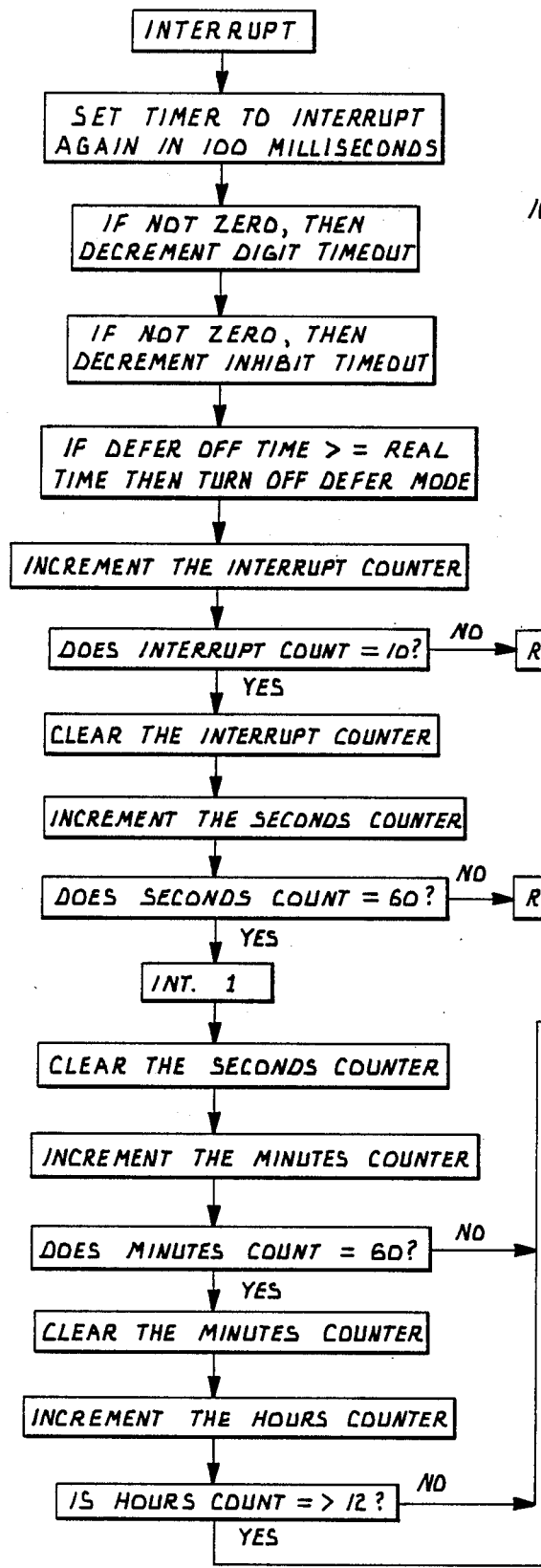
FIG. 7 is a flow chart for the time keeping scheme of the software.

FIG. 7 depicts in flow chart form the software that keeps track of time on the basis of interrupt signals and deactivates the defer mode when the defer time is reached. It is noted that the defer mode is exited automatically and normal operation resumes at the defer time.

Figure 8:
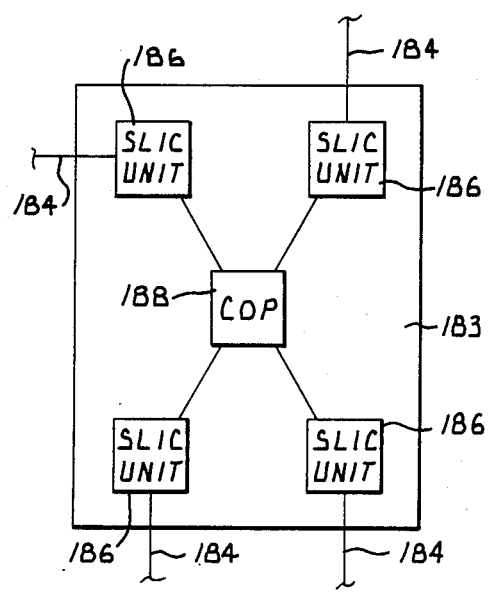
FIG. 8 is a diagrammatic view of a telephone central office in which the call deferral system may be implemented.

The call deferral system of the present invention may be implemented within a telephone central office as well as at the premises of the subscriber. Referring to FIG. 8, numeral 183 identifies a central office which serves multiple telephone subscriber lines 184. Each telephone line 184 connects in the central office with its own dedicated subscriber line interface circuit (SLIC unit) 186 which is an electronic device that performs the functions of decoding DTMF signals, generating dial tones, providing tip and ring operating current, detecting on hook/off hook status and generating ringer voltage. Some SLIC units also code/decode voice communication into/from digital data.

Within the central office 183, a central office processor (COP) 188 operates to control the SLIC units 186. In accordance with the present invention, the COP 188 is programmed such that it recognizes some of the subscriber lines 184 as authorized call defer lines and others as not. When a subscriber line is off hook and is an authorized call defer line, the COP 188 awaits either a valid telephone number entry or a special function (call defer) command.

The call defer command is entered from the telephone key pad of an authorized line and requires only an entry of the properly entered defer time or the defer period during which calls are to be deferred. The COP 188 already keeps track of the time of day and can compute the defer time by adding the defer period to the time of day at its entry. While the subscriber line is in the defer mode, calls placed to it will not be completed but will instead be intercepted at the central office 183. The calling party will be given a voice message informing him of the number that has been dialed, the fact that the called party is not accepting calls, and the time when the call can be placed without intervention. The defer mode can be cancelled at any time by the entry of a cancel code from a telephone set on the subscriber line.

In this way, existing hardware (the SLIC units 186 and COP 188) at the central office can be used to implement call deferral at the central office. Implementation at the central office is similar to implementation at the premises of the subscriber, with the important difference that in the central office implementation, long distance (and even local) calls are not completed to a customer station which is in the defer mode. Consequently, the call will not be billed, and this is an attractive attribute to the central office implementation.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations.

This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Telephone call deferral apparatus for deferring telephone calls on a subscriber telephone line having a telephone set that functions in a normal operating mode to receive incoming calls from calling parties and generate a ring signal when an incoming call is received, said apparatus comprising:
   means for keeping the time of day;
   means for receiving signals entered at the telephone set commanding initiation of a user selected defer period during which incoming calls to the telephone set are to be interrupted;
   means for adding the defer period to the time of day at the time of is command compute a defer time at which the defer period is set to expire;
   means for intercepting incoming calls and suppressing the right signal during the defer period;
   means for transmitting a message specifying the defer time to each calling party; and
   means for automatically effecting the normal. operating mode at the defer time.

2. Apparatus as set forth in claim 1, wherein:
   said receiving means operates in a first call defer mode to receive encoded signals commanding a defer period; and
   said receiving means includes means for receiving encoded signals entered at the telephone set commanding a defer time directly in a second call defer mode.

3. Apparatus as set forth in claim 2, wherein: the telephone set includes a key pad having first an second special function key and a plurality of digit keys; and
   said receiving means is operable to detect an encoded signal from the first special function key to enter the first call defer mode and to detect an encoded signal from the second special function key to enter the second call defer mode.

4. Apparatus as set forth in claim 4, wherein said receiving means is operable to detect encoded signals from the digit keys as commands specifying the duration of the defer period in the first call defer mode.

5. Apparatus as set forth in claim 4, wherein said receiving means is operable to detect encoded signals from the digit keys as commands specifying the defer time in the second call defer mode.

6. Apparatus as set forth in claim 3, wherein said receiving means is operable to detect encoded signals from the digit keys as commands specifying the defer time in the second call defer mode.

7. Apparatus as set forth in claim 1, including:
   means for inhibiting said intercepting and suppressing means for a preselected time period when a prescribed sequence of encoded signals is applied to the telephone line from a calling party following transmission of the message specifying the defer time, whereby incoming calls are received if made during said preselected time period.

8. Apparatus as set forth in claim 1, wherein said receiving means is disabled for a preselected time following transmission of the message specifying the defer time.

9. Apparatus as set forth in claim 1, wherein: the telephone line has at least one telephone set in addition to the first mentioned telephone set; and
   said receiving means is operable to receive encoded command signals entered at any of the telephone sets.

10. Telephone call deferral apparatus for allowing incoming calls from calling parties to be deferred on a subscriber telephone line connected with a plurality of telephone sets each having ringer means and a key pad for generating encoded signals on the telephone line, said apparatus comprising:
    means for receiving said encoded signals generated from any of the telephone sets;
    means for distinguishing encoded signals which signify an outgoing call from other encoded signals;
    means for interpreting selected sequences of said other encoded signals as valid commands to place the telephone line in a defer mode until a defer time which is dependent upon the encoded signals received;
    means for intercepting incoming calls on the telephone line and suppressing said ringer means of all of the telephone sets prior to said defer time;
    means for transmitting a message specifying said defer time to the calling parties; and
    means for terminating the defer mode at a said defer time.

11. Apparatus as set forth in claim 10, wherein:
    each key pad includes first and second special function keys and a plurality of digit keys;
    said interpreting means is operable in a first mode to interpret the entry of digit key signals as a command to enter the defer mode for a defer period dependent upon the digit key signals entered; and
    said intercepting means including means for determining the time of day and calculating the defer time by adding the defer period to the time of day when the defer mode is entered.

12. Apparatus as set forth in claim 11, wherein said interpreting means is operable in a second mode to interpret the entry of digit key signals as a command to enter the defer mode until a defer time determined directly by the digit key signals entered.

13. Apparatus as set forth in claim 12, wherein said interpreting means is placed in the first mode by entry of the first special function key signal and the second mode by entry of the second special function key signal.

14. Apparatus as set forth in claim 10, including means for discontinuing the defer mode for a preselected time if a calling party enters a prescribed access code signal on the telephone line following the transmission of the message specifying the defer time to the calling party, whereby incoming calls are received during said preselected time.

15. Apparatus as set forth in claim 10, including means for disabling said interpreting means for a preselected time following each transmission of the message specifying the defer time.

16. Telephone call deferral apparatus for a telephone network which includes a telephone line for each subscriber, one or more telephone sets on each telephone line having key pads for entering DTMF signals on the line, and a ringer for each telephone set to generate a ring signal indicating an incoming call from a calling party, said apparatus comprising:
    interface means for providing an interface with a subscriber line in a manner presenting a relatively high DC impedance circuit in an on hook state and a relatively low DC impedance circuit in an off hook state;

DTMF decoder means coupled with said interface means in a manner to receive DTMF signals applied to said subscriber line from any of the telephone sets thereon;

means for interpreting selected DTMF signal sequences as valid commands to place said subscriber line in a defer mode during which incoming calls are deferred;

means for intercepting incoming calls on said subscriber line and suppressing the ringer for each telephone set thereon while said subscriber line is in the defer mode;

means for terminating the defer mode at a defer time dependent upon the DTMF signals entered in said selected DTMF signal sequences;

speech synthesizer means having voice messages that may be selected and transmitted on said subscriber line to the telephone line of a calling party; and means for selecting voice messages from said speech synthesizer means in a manner to construct messages that include the defer time then in effect and transmitting the selected messages from said subscriber line to the telephone lines of calling parties placing calls to the subscriber line while it is in the defer mode.

17. Apparatus as set forth in claim 16, including:
means for keeping the time of day;
first and second special function keys and a plurality of digit keys on each key pad; and
means for computing the defer time based on the digit keys entered in said selected DTMF signal sequences.

18. Apparatus as set forth in claim 17, wherein:
said interpreting means operates in a first mode to interpret digit keys as commands establishing a defer period having a duration dependent upon the digit keys signals entered; and
said computing means is operable to compute the defer time by adding the defer period to the time of day it is initiated in the first mode of the interpreting means.

19. Apparatus as set forth in claim 18, wherein:
said interpreting means operates in a second mode to interpret digit key signals as specifying the defer time;
said computing means is operable to compute the defer time directly from digit key signal entries made in the second mode; and
said interpreting means enters the first mode in response to entry of said first special function key signal and enters the second mode in response to entry of said second special function key signal.

20. A method of controlling incoming telephone calls placed on a subscriber telephone line having a telephone set with a ringer and a key pad, said method comprising the steps of:
keeping the time of day;
entering on the key pad a series of key entries representing an encoded command to defer all incoming calls for a user selected defer period;
adding the defer period to the time of day at which said series of key entries is made to compute a defer time;
intercepting incoming calls during the defer period;
suppressing said ringer during the defer period; and
providing on the telephone line a message to a calling party which includes the defer time whenever an incoming call is placed during the defer period.

21. Telephone call deferral apparatus for deferring telephone calls on a subscriber telephone line having a telephone set that functions in a normal operating mode to receive incoming calls from calling parties and generate a ring signal when an incoming call is received, said apparatus comprising:
means for receiving signals entered at the telephone set commanding initiation of a user selected defer period during which incoming calls to the telephone set are to be interrupted and after which incoming calls are to be received;
means for intercepting incoming calls and suppressing the ring signal during the defer period;
means responsive to the interception of an incoming call for transmitting to the calling party a message indicating when the defer period will have expired; and
means for automatically effecting the normal operating mode upon expiration of the defer period.

* * * * *

UNITED STATES PATENT AND TRADEMARK OFFICE
CERTIFICATE OF CORRECTION

PATENT NO. : 4,893,329
DATED : January 9, 1990
INVENTOR(S) : Terry D. O'Brien

It is certified that error appears in the above-identified patent and that said Letters Patent is hereby corrected as shown below:

Col. 11, line 21, "at the time of is command compute" should read --at the time of its command to compute--

Col. 11, line 24, "right signal" should read --ring signal--

Col. 11, line 38, "an second" should read --and second--

Col. 11, line 45, "claim 4" should read --claim 3--

Col. 13, line 35, "keys" should read --key signals--

Col. 13, line 41, "keys signals" should read --key signals--

Signed and Sealed this

Sixteenth Day of July, 1991

Attest:

HARRY F. MANBECK, JR.

Attesting Officer

Commissioner of Patents and Trademarks